(12) United States Patent
Curran

(10) Patent No.: US 7,690,698 B1
(45) Date of Patent: Apr. 6, 2010

(54) SYSTEM AND METHOD FOR FACILITATING PIPE AND CONDUIT COUPLING

(75) Inventor: John M. Curran, Brea, CA (US)

(73) Assignee: Shapco Inc., Santa Monica, CA (US)

( * ) Notice: Subject to any disclaimer, the term of this patent is extended or adjusted under 35 U.S.C. 154(b) by 469 days.

(21) Appl. No.: 10/613,539

(22) Filed: Jul. 3, 2003

(51) Int. Cl.
*F16L 21/06* (2006.01)
*F16L 21/02* (2006.01)

(52) U.S. Cl. .................... 285/367; 285/366; 285/373; 285/420

(58) Field of Classification Search ................ 285/366, 285/367, 368, 373, 410, 412, 419, 420; 411/531, 411/533, 534, 542, 544, 546, 353, 999
See application file for complete search history.

(56) References Cited

U.S. PATENT DOCUMENTS

| | | | | |
|---|---|---|---|---|
| 1,547,162 A * | 7/1925 | Bohlman | ................. | 411/533 |
| 1,874,462 A * | 8/1932 | Crowther | ................. | 411/82.2 |
| 1,970,078 A * | 8/1934 | Dillon | ................. | 285/18 |
| 2,028,182 A * | 1/1936 | Barnickol, Jr. | ................. | 285/112 |
| 2,141,312 A * | 12/1938 | Miyauchi | ................. | 313/287 |
| 2,779,375 A * | 1/1957 | O'Connor | ................. | 411/134 |
| 3,479,066 A * | 11/1969 | Gittleman | ................. | 285/236 |
| 3,603,617 A * | 9/1971 | Lochridge | ................. | 285/24 |
| 3,756,629 A * | 9/1973 | Gibb | ................. | 285/112 |
| 4,191,389 A * | 3/1980 | Jelinek | ................. | 411/542 |
| 4,281,863 A * | 8/1981 | Hall | ................. | 285/382.2 |
| 4,381,020 A * | 4/1983 | Daghe et al. | ................. | 138/99 |
| 4,417,755 A * | 11/1983 | Gittleman | ................. | 285/373 |
| 4,653,782 A * | 3/1987 | Munday | ................. | 285/373 |
| 4,911,594 A * | 3/1990 | Fisher | ................. | 411/437 |
| 5,090,742 A * | 2/1992 | Cohen et al. | ................. | 285/114 |
| 5,121,946 A * | 6/1992 | Jardine | ................. | 285/15 |
| 5,157,814 A * | 10/1992 | Mann | ................. | 24/135 R |
| 5,480,193 A * | 1/1996 | Echols et al. | ................. | 285/45 |
| 5,620,290 A * | 4/1997 | Homfeldt et al. | ................. | 411/533 |
| 6,076,861 A * | 6/2000 | Ikeda | ................. | 285/112 |
| 6,367,849 B1 * | 4/2002 | Tatsuta et al. | ................. | 285/373 |
| 6,581,977 B1 * | 6/2003 | Dole et al. | ................. | 285/112 |
| 6,732,982 B1 * | 5/2004 | Messinger | ................. | 248/74.1 |
| 2003/0062718 A1 * | 4/2003 | Radzik | ................. | 285/94 |

* cited by examiner

*Primary Examiner*—James M Hewitt
(74) *Attorney, Agent, or Firm*—Evanns & Walsh; Joseph R. Evanns

(57) ABSTRACT

An improved system and method for facilitating pipe and conduit coupling comprises a clamp having at least one screw hole for insertion therethrough of at least one screw for insertion for a further clamp for being screwed to fasten the clamps together on ends of pipes to be coupled, at least one gasket between the clamps and pipe and including at least one retainer to engage with the screw to prevent the screw from displacement prior to being screwed into fastening relationship with the gasket and the pipe. An improved method for facilitating pipe coupling comprises providing clamps fastenable together around ends of pipes, a gasket to be placed between the clamps and the pipe ends and providing at least one retainer to engage the screw to prevent it from being displaced through a screw hole prior to fastening the clamps around the pipe ends.

29 Claims, 5 Drawing Sheets

SYSTEM AND METHOD FOR FACILITATING PIPE AND CONDUIT COUPLING

FIELD OF THE INVENTION

The invention pertains to improved systems and methods for facilitating pipe and conduit coupling, i.e., coupling ends of pipes in substantially fluid-tight relationship.

DESCRIPTION OF THE PRIOR ART

Pipe coupling for coupling ends of fluid-carrying pipes in a substantially fluid-tight manner is described and claimed in U.S. Pat. No. 3,479,066 to Morris Gittlemann. The teaching of the '066 patent is incorporated by reference herein to the extent applicable. The apparatus and systems of the '066 patent have been widely employed in the United States and abroad, with substantial success in terms of efficiency, effectiveness and usability.

Over the years experience has disclosed room for improvement of devices, constructed under the '066 patent. This involves use of such devices in the field. In connection with such use, the user of the device endeavors to fasten together a pair of clamping members around pipe ends. Such fastening is accomplished by putting screws through screw holes on clamping members and screwing tight such that the clamping members fasten together to the extent that the pipe ends are substantially fluid-tight. During this operation, there has been a tendency under particular circumstances of use in the field for the screws to slide back through the screw holes while being prepared for screwing into fastening relationship, resulting in obvious inefficiency and lost time.

Accordingly there has been a long-felt and unfulfilled need for an improved system and method for facilitating pipe and conduit coupling.

SUMMARY OF THE INVENTION

An improved system and method for facilitating pipe and conduit coupling comprises clamping means having at least one screw hole for insertion therethrough of at least one screw for insertion through a further clamping means for being screwed to fasten said clamping means together on ends of pipes to be coupled, gasket means between said clamping means and said pipe and further including retention means for engagement with said at least one screw to prevent said at least one screw from displacement prior to said at least one screw being screwed into fastening relationship with said gasket means and said pipe.

An improved method for facilitating pipe coupling comprises the steps of providing clamping means fastenable together around ends of pipes to be coupled by use of at least one screw, providing gasket means for placement between said clamping means and said pipe ends, and providing at least one retention means for engaging with said at least one screw to prevent said at least one screw from being displaced through a screw hole prior to fastening of said clamp means around said pipe ends.

DETAILED DESCRIPTION OF THE INVENTION

The instant invention being an improvement on the pipe coupling system disclosed and claimed in U.S. Pat. No. 3,479,066 to M. Gittleman (the '066 patent), the '066 patent is incorporated in the instant application by reference to the extent that it is applicable. Accordingly, on occasion descriptions of common elements as between the instant specification and that of '066 patent will refer to such elements in the '066 patent and will be brief.

Figure 5:
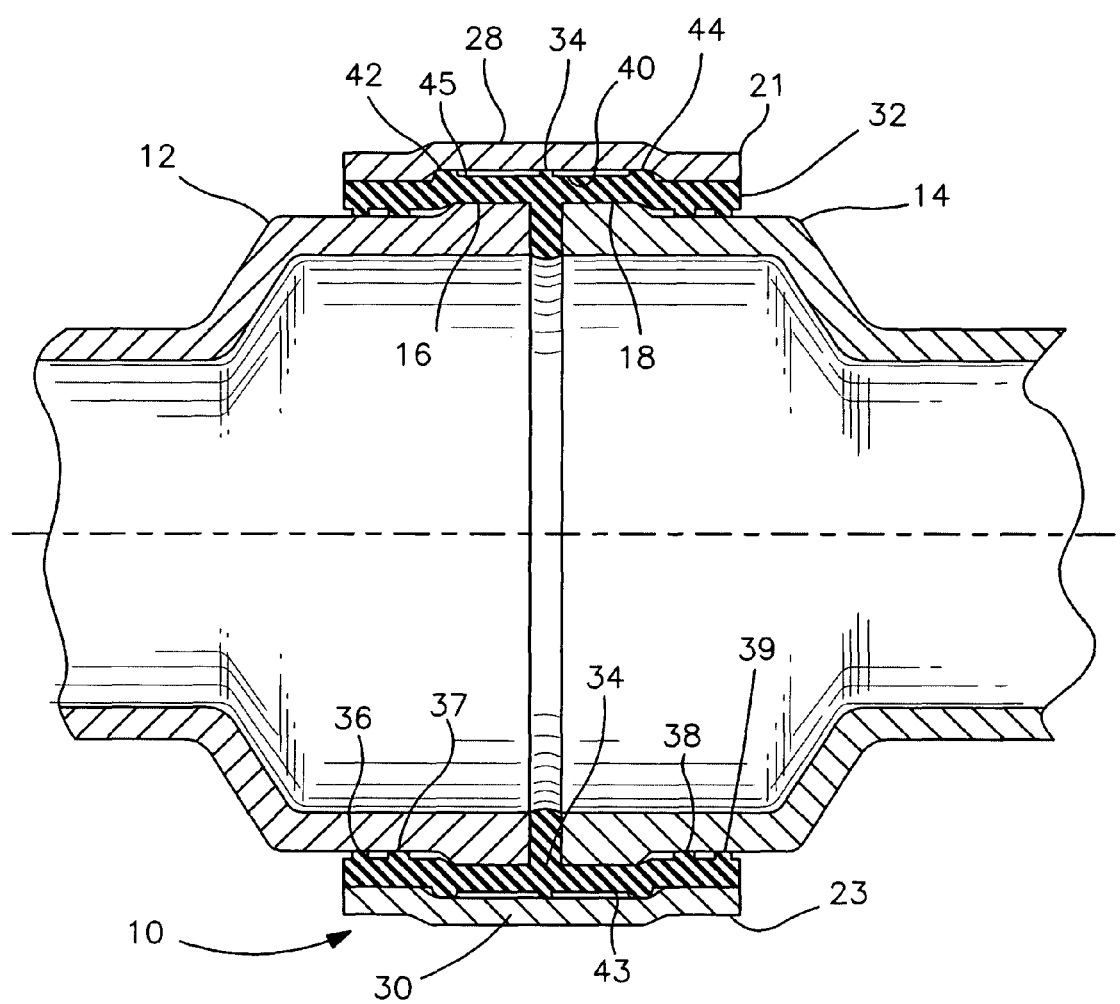
FIG. 5 is a sectional view of assembled pipe coupling apparatus in place on pipes, in accordance with the invention.

As shown in FIG. 5, a pipe coupling system 10 is depicted in place coupling together, in substantially fluid-tight relationship, pipes or conduits 12, 14 by installation thereon at the ends thereof.

Pipe sections 12, 14 are depicted as being of type with spigots that is, angular end ribs 16,18, respectively. As described in detail in the specification of the '066 patent, the pipe coupling system described and claimed therein includes provisions for and constructions for use with variations of pipe ends to be coupled, including end configurations and forms of transverse members thereon.

The present invention is usable with all variations of pipes and the forms of pipe coupling employed therewith as is more fully described hereinbelow.

Pipe coupling system 10 includes semi-circular clamping members 20,22 having, respectively, pairs of generally radial flanges 21,23. Flange pair 23 defines two pairs of screw holes 48, 48', 50, 50'; in the same manner flange pair 21 defines two pairs of screw bolts 52,52' with another pair (not shown). The screw holes are capable of being aligned such as to permit clamp members 20, 22 to be fastenable together by frictional engagement shown in a specific embodiment to be in the form of two pairs of screw members 24,24', 26,26' having shanks 25, 25', 27, 27', respectively. Clamping members 20, 22 have internal recesses 28, 30 respectively and have greater external dimensions opposite recesses 28,30.

A gasket member 32 is positionable between clamping members 20,22 and pipe sections 12,14 to effect a seal therebetween. Gasket member 32 may be made of any suitable flexible sealing material such as rubber or neoprene. Gasket member 32 has an internal annular rib 34, as well as outer annular ribs in pairs 36, 37 and 38, 39, respectively adjacent opposite ends of gasket member 32.

Gasket member 32 defines an intermediate external annular rib 40. Member 32 also defines external annular ribs 42,44 spaced from intermediate external rib 40 such as to define recesses 43, 45 between rib pairs 40, 42 and 40, 44, respectively.

Figure 1:
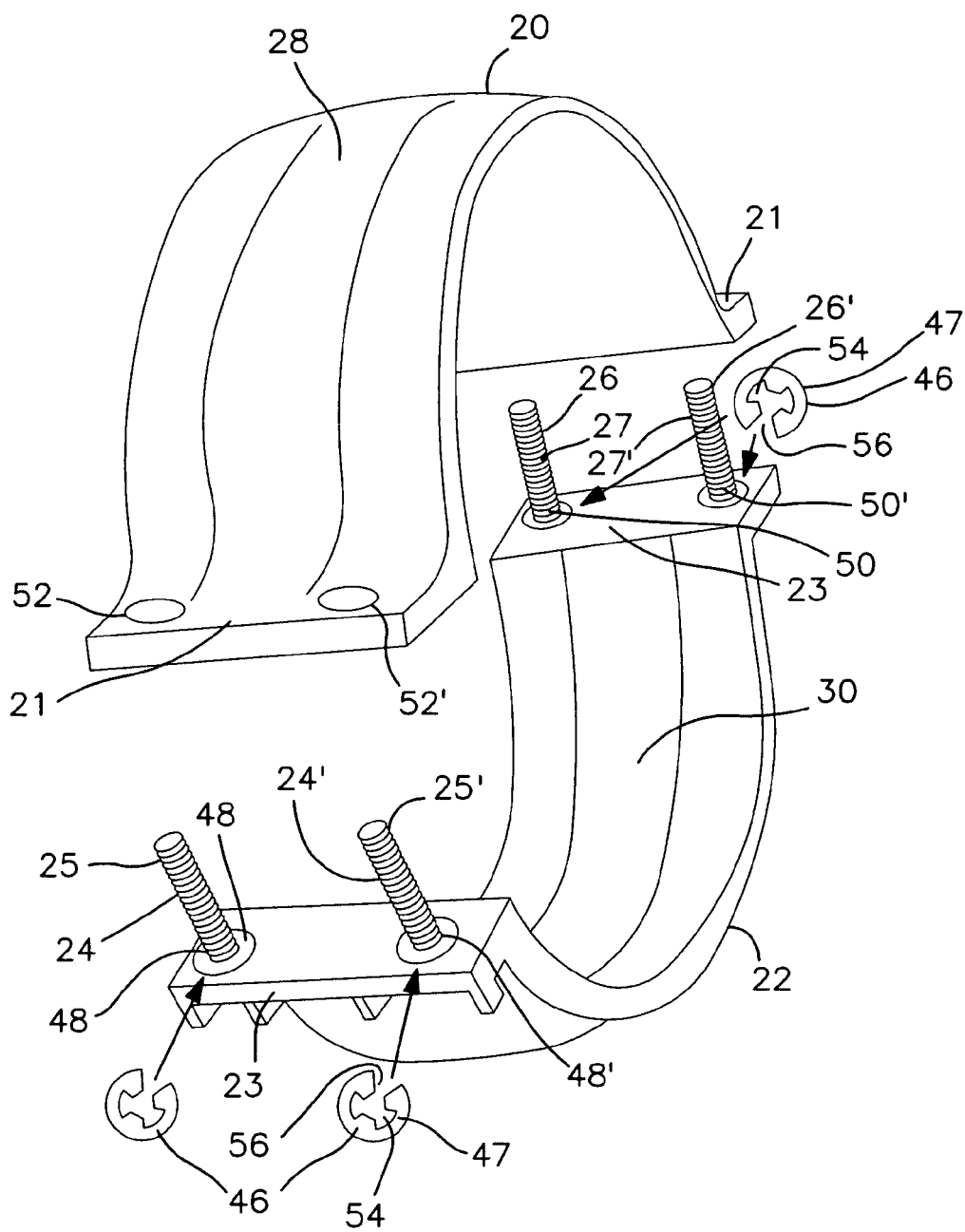
FIG. 1 is a perspective view somewhat simplified of clamping means with retention means in accordance with the invention in the unengaged state.

Depicted in FIG. 1 are clamping members 20,22 with screw pairs 24,24' and 26,26' in place in screw holes 48, 48', 50, 50', 52, 52', and the additional pair (not shown) on flanges pair 21 and retention, means 46 in accordance with the invention in position to be engaged with screws 24,24' 26,26'. At this point, screws 24,24', 26,26' will tend to fall back through the screw holes unless prevented from doing so.

Figure 2:
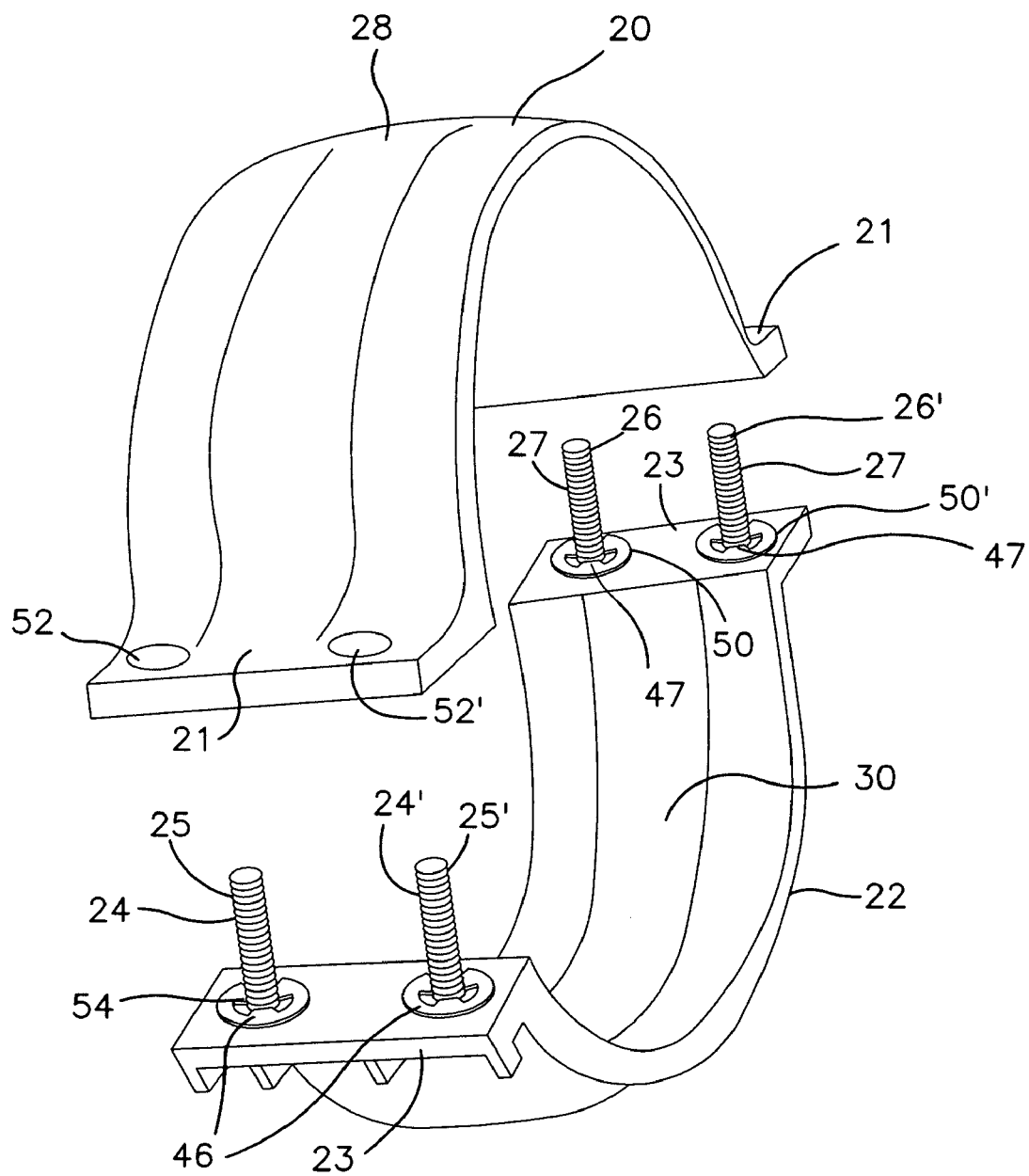
FIG. 2 is a respective view somewhat simplified as in FIG. 1 with retention means in accordance with the invention in the engaged condition.

Depicted in FIG. 2, are retention means 46 in place to prevent backward motion from, i.e., disengagement from, screw holes 48,48', 50,50', 52, 52'.

Figure 4A:
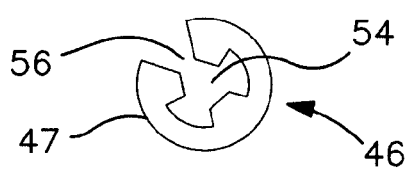
FIGS. 4(a)-4(e) are top views of forms of retention means in accordance with the invention.

Retention means 46 as shown in FIG. 4A is in the form of a resilient peripheral disc 47 of generally circular configuration defining an internal opening 54 of generally polygonal configuration such as to accommodate and provide frictional engagement with screws 24,24', 26,26'. A slot 56 is defined in the peripheral disc 47 for placing retention means 46 onto screws, 24, 24', 26, 26', from the ends of shanks 25, 25', 27, 27'.

In addition, disposition of retention means 46 onto screws 24, 24', 26, 26' may be accomplished by pressing retention means 46 onto screws 24, 24' 26, 26' through opening 54 from the sides of shanks 25, 25', 27, 27'.

The mode of disposition of retention means 46 onto screws 24, 24', 26, 26', (i.e., through slot 54 or through opening 56) may be selected by the user depending upon particular conditions in the field or personal preference.

Figure 4B:
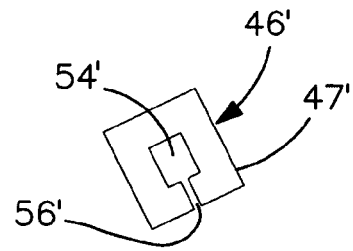

Additional forms of retention means are depicted in FIGS. 4B-4F, inclusive. Depicted in FIG. 4B is retention means 46'. Retention means 46' comprises a peripheral member 47' of substantially square configuration defining an internal opening 54' of generally square shape to accommodate and provide engagement with screws 24, 24', 26, 26'. Slot 56', defined in peripheral member 47', is employed for laterally placing retention means 46', onto screws 24, 24', 26, 26'.

Figure 4C:
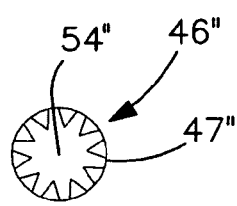

FIG. 4C depicts yet another form of retention means designated by reference numeral 46". Retention means 46" comprises a generally circular disc 47" of resilient material defining an opening 54" for placement, upon screws 24, 24', 26, 26' opening 54" being of star-like configuration engageable with screws 25, 25', 26 26'.

Figure 4D:
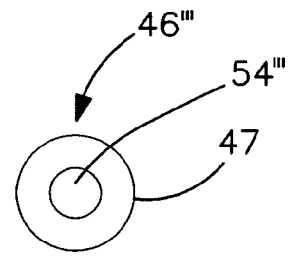

FIG. 4D depicts a further form of retention means designated by reference numeral 46''' comprising a resilient peripheral circular disc 47''' defining an internal circular opening 54''' for fitting onto screws 24, 24', 26, 26'.

Figure 4E:
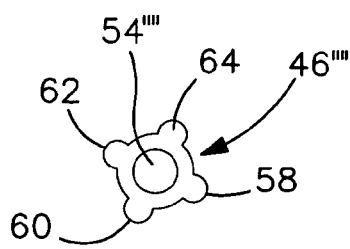

FIG. 4E depicts another form of retention means 46'''' with a periphery having ears 58,60,62,64 at four (4) corners thereof and defining a circular internal opening 54'''' for mounting on screws 24, 24', 26, 26'.

Figure 3:
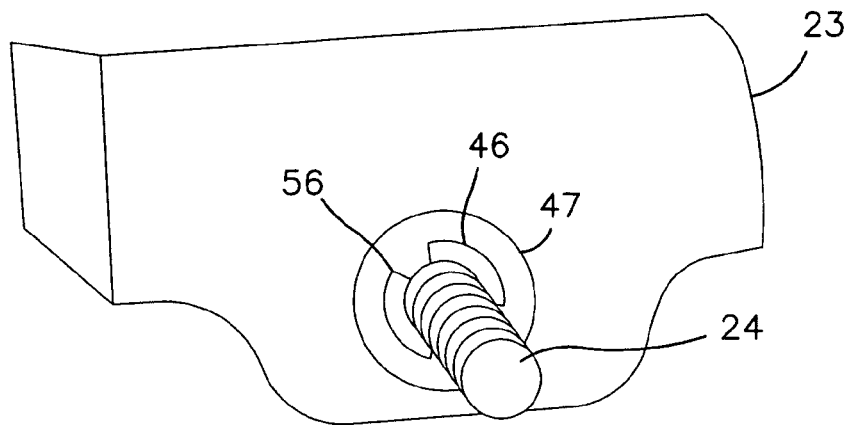
FIG. 3 is a fragmentary view of a clamping member with engaged retention means in accordance with the invention.

FIG. 3 further depicts retention means 46 in place on screw 24 in operative position to prevent backward, outward motion of screw 24 during operation to couple pipe ends.

The '066 patent specification depicts and describes variations in pipe end configurations and corresponding coupler constructions, and said depictions and descriptions are incorporated by reference herein. Retention means in accordance with the invention are employable to facilitate implementing pipe coupling in the application hereinabove discussed is the same manner as described and depicted herein for pipe ends with spigots.

The aforesaid varying applications depicted and described in the '066 patent include:

(1) Each pipe to be coupled having an end spigot ('066 patent, FIG. 1);
(2) One pipe to be coupled having an end spigot, and the other pipe being without an end spigot ('066 patent, FIG. 5);
(3) Neither pipe to be coupled having an end spigot ('066 patent, FIG. 2);
(4) Each pipe to be coupled having an end annular rib ('066 patent, FIG. 11);
(5) One pipe to be coupled having an end annular rib ('066 patent, FIG. 12);
(6) Neither pipe to be coupled having an end annular rib ('066 patent, FIG. 13);
(7) Only one pipe to be coupled having end annular rib or spigot ('066 patent, FIG. 17); and
(8) Neither pipe to be coupled having a spigot or annular rib ('066 patent, FIG. 18).

Figure 6:
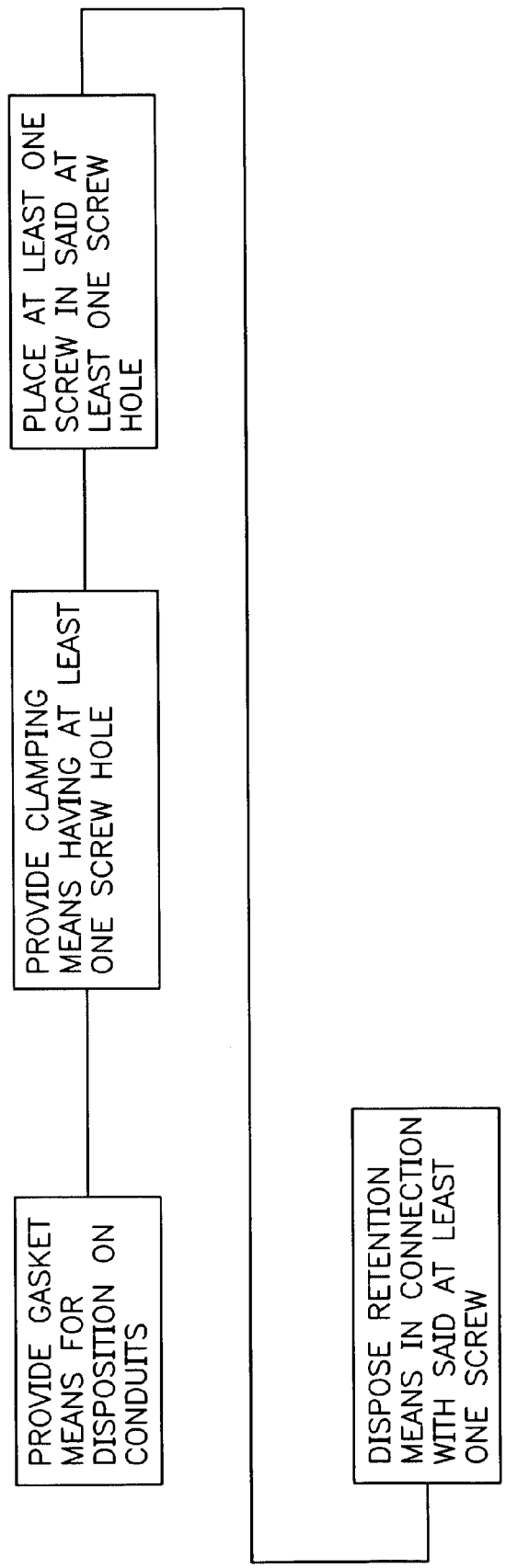
FIG. 6 is a schematic diagram of a method in accordance with the invention.

In operation and in accordance with the method of the invention as schematically rendered in FIG. 6, the user of the improved pipe coupling system 10 in accordance with the invention prepares to couple together ends of pipe sections 12,14, by placing gasket 32 on the ends of the ends of pipes 12, 14. The user then deploys clamp members 20,22 and inserts screws 24, 24', 26, 26' through screw holes 48, 48', 50, 50' 52,52', respectively. In so doing, the user positions retention means 46 on each screw as it is inserted through its respective screw hole, thus preventing each of said screws from being displaced from its position by gravity or motion of the clamping member into which it is inserted. As noted above, retention of inserted screws by retention means 46 is in the described embodiment accomplished by frictional engagement of retention means 46 with the respective screws 24, 24', 26, 26'. Other means of retention, such as adhesives, adherent material (such as the material trademarked as VEL-CRO) and the like may be employed for, in or on retention means in accordance with the invention.

The user then aligns clamp members 20, 22, places them around pipes 12, 14 and gasket 32 thereon, and fastens members 20, 22 together by means of tightening said screws until a fluid tight seal is achieved between pipes 12, 14 at the ends thereof.

The embodiments of the insertion described and depicted herein are illustrative and exemplary. The invention is defined pursuant to law by the appended claims interpreted in light of the specification and drawings.

What is claimed is:

1. A system for facilitating coupling pipes at their ends in substantially fluid-tight relationship comprising:
    (1) Clamping means for clamping around said pipe ends said clamping means including at least one screwhole for receiving at least one screw for fastening, by securing at least one nut thereon, said clamping means over gasket means and said pipe ends, said at least one screw being configured such that it is loosely disposed in said at least one screw hole of said clamping means prior to fastening of said clamping means around said pipe ends;
    (2) gasket means for interposition between said clamping means and said pipe ends; and
    (3) resilient retention means, resiliently engageable with said at least one screw, for loosely retaining said at least one screw in said at least one screw hole while said at least one screw is loosely disposed in said at least one screw hole prior to fastening said clamping means together by securing said at least one nut with said at least one screw, said resilient retention means being resiliently positionable from the side of the shank and from the front of the shank of said at least one screw into engagement with said at least one screw to loosely retain said at least one screw in said screw hole prior to fastening said clamping means together by securing said at least one nut with said at least one screw.

2. The invention as set forth in claim 1 wherein said retention means is resiliently engageable with said at least one screw by placement between threads thereof to provide said retention.

3. The invention as set forth in claim 1 wherein said resilient retention means is resiliently positionable on the end of the shank of said at least one screw for resilient engagement therewith.

4. The invention as set forth in claim 1 wherein said resilient retention means comprises a member composed of resilient material.

5. The invention as set forth in claim 2 wherein said resilient retention means is thin relative to the length of said at least one screw.

6. The invention as set forth in claim 2 wherein said resilient retention means is composed of resilient metal.

7. The invention as set forth in claim 2 wherein said resilient retention means defines at least one internal opening for being positioned onto said at least one screw from the end of the shank thereof.

8. The invention as set forth in claim 2 wherein said resilient retention means defines at least one lateral opening having two separate ends for sideways resilient positioning of said retention means upon the shank of said at least one screw by resiliently displacing from each other said two ends of said at least one lateral opening to accommodate said at least one screw.

9. The invention as set forth in claim 2 wherein said resilient retention means has a generally circular configuration.

10. The invention as set forth in claim 2 wherein said resilient retention means has a generally square configuration.

11. The invention as set forth in claim 7 wherein at least one internal opening is substantially polygonal.

12. The invention as set forth in claim 2 wherein said resilient retention means includes adhesive means for adhesion to said at least one screw.

13. In a pipe coupling system for coupling pipe ends in substantially fluid-tight relationship including gasket means positionable on said pipe ends and clamping means fastenable on said pipe ends and said gasket means, said clamping means being fastenable by securing at least one nut on at least one screw insertable through at least one screw hole in said clamping means, said at least one screw being loosely disposed in said at least one screw hole prior to securing of said at least one screw by said at least one nut, the improvement comprising:

resilient retention means for loosely retaining said at least one screw in place when loosely disposed in said at least one screw hole in said clamping means and prior to fastening of said clamping means by securing said at least one nut on said at least one screw, said resilient retention means being resiliently positionable from the side of the shank of said at least one screw into retention engagement to loosely retain said at least one screw in said at least one screw hole.

14. The invention as set forth in claim 13 wherein said retention means is resiliently engageable with said at least one screw.

15. The invention as set forth in claim 13 wherein said resilient retention means is resiliently positionable at the end of the shank of said at least one screw for resilient engagement therewith.

16. The invention as set forth in claim 13 wherein said resilient retention means comprises a member composed of resilient material.

17. The invention as set forth in claim 13 wherein said resilient retention means is thin relative to the length of said at least one screw.

18. The invention as set forth in claim 13 wherein said resilient retention means is composed of resilient metal.

19. The invention as set forth in claim 13 wherein said resilient retention means defines at least one internal opening for being placed onto said at least one screw from the end of the shank thereof.

20. The invention as set forth in claim 13 wherein said retention means defines at least one lateral opening having two separate ends for resilient sidewise placing of said resilient retention means upon the shank of said at least one screw by displacing said two separate ends from each other to accommodate said at least one screw.

21. The invention as set forth in claim 13 wherein said resilient retention means has a generally circular configuration.

22. The invention as set forth in claim 13 wherein said resilient retention means has a generally square configuration.

23. The invention as set forth in claim 19 wherein at least one internal opening is substantially polygonal.

24. The invention as set forth in claim 13 wherein said resilient retention means include adhesive means for adhesion to said at least one screw.

25. The invention as set forth in claim 13 wherein said resilient retention means is positionable upon said at least one screw from the side of the shank thereof for resilient engagement between threads of said at least one screw.

26. A method for facilitating coupling at least two conduits at their ends in substantially fluid-tight relationship comprising the steps of:
(1) providing gasket means for disposition upon said at least two conduits;
(2) providing clamping means for clamping around said conduit ends and including at least one screw hole for receiving at least one screw for fastening said clamping means upon said gasket means and said conduit ends in substantially fluid-tight relationship by securing at least one nut to said at least one screw;
(3) placing said at least one screw loosely in said at least one screw hole prior to securing said at least one nut to said at least one screw; and
(4) disposing resilient retention means laterally upon the side of the shank of or upon the front of said at least one screw to prevent said at least one screw from exiting said at least one screw hole prior to said fastening of said clamping means and said gasket means.

27. The method as set forth in claim 26 wherein said resilient retention means is resiliently engageable with said at least one screw to accomplish retention thereof.

28. The method of claim 26 further including the step of fastening said gasket means and said clamping means onto said conduit ends by tightening said at least one screw until substantially fluid-tight relationship is achieved between said conduits.

29. The method of claim 26 wherein said conduits comprise pipes.

* * * * *